US012689302B2

(12) United States Patent
Graw

(10) Patent No.: US 12,689,302 B2
(45) Date of Patent: Jul. 21, 2026

(54) PIECE-WISE LINEAR CONTROL SYSTEM FOR A RESONANT CONVERTER

(71) Applicant: Fluke Corporation, Everett, WA (US)

(72) Inventor: Jeffrey D. Graw, Woellersdorf (AT)

(73) Assignee: Fluke Corporation, Everett, WA (US)

( * ) Notice: Subject to any disclaimer, the term of this patent is extended or adjusted under 35 U.S.C. 154(b) by 207 days.

(21) Appl. No.: 18/650,528

(22) Filed: Apr. 30, 2024

(65) Prior Publication Data

US 2024/0372465 A1 Nov. 7, 2024

Related U.S. Application Data

(60) Provisional application No. 63/499,617, filed on May 2, 2023.

(51) Int. Cl.
H02M 3/335 (2006.01)
H02M 1/00 (2007.01)
H02M 3/00 (2006.01)

(52) U.S. Cl.
CPC ..... H02M 3/33571 (2021.05); H02M 1/0058 (2021.05); H02M 3/01 (2021.05)

(58) Field of Classification Search
CPC ... H02M 3/33569–33592; H02M 3/01; H02M 1/0003
See application file for complete search history.

(56) References Cited

U.S. PATENT DOCUMENTS 7,688,600 B2 * 3/2010 Sauerlander ........ H02M 3/3382
363/17
9,634,571 B2 * 4/2017 Rutgers ............. H02M 3/33571

FOREIGN PATENT DOCUMENTS

| CN | 100576709 C | 12/2007 | |
| EP | 3829044 A1 * | 6/2021 | ............ H05B 45/39 |
| KR | 10-2016-0055509 A | 5/2016 | |

(Continued)

OTHER PUBLICATIONS

Abdel-Rahman, S. "Resonant LLC Converter: Operation and Design 250W 33Vin 400Vout Design Example", Application Note AN Sep. 2012 V1.0 Sep. 2012, www.infineon.com, 19 pages.

(Continued)

*Primary Examiner* — Crystal L Hammond
*Assistant Examiner* — Jennifer C Caulk
(74) *Attorney, Agent, or Firm* — Seed Intellectual Property Law Group LLP

(57) ABSTRACT

A control system controls an inductor-inductor-capacitor (LLC) converter according to a switching method that tunes the output power of the LLC converter based on the required power to be supplied to an output load coupled to the LLC converter. The tuning of the output power is based in part on changing the duty cycle of a switching module. In addition, the output power is adjustable by changing a frequency of switching (e.g., a switching cycle of the switching module output). The control system is capable of adjusting amplitude and changing rising slope of a current supplied to the output load by changing the duty cycle and switching cycle of the switching. A piece-wise linear control method is achieved by controlling the duty cycle and switching cycle differently when the input voltage is lower than a crossover voltage than when the input voltage is higher than the crossover voltage.

20 Claims, 7 Drawing Sheets

(56)                    References Cited

FOREIGN PATENT DOCUMENTS

KR          20160055509  A  *  5/2016   .............. H02M 3/28

OTHER PUBLICATIONS

Fairchild Semiconductor Corporation, "LLC Resonant Converter Design using FAN7688", AN-6104, 2015, www.fairchildsemi.com, 22 pages.
Jang, J. et al. "Current Mode Control for LLC Series Resonant DC-to-DC Converters", Energies 2015, 8, 6098-6113; doi:10.3390/en8066098, www.mdpi.com/journal/energies, 16 pages.
Kowstubha, P. et al., "Review on Different Control Strategies of LLC Series Resonant Converters", 2014 International Conference on Advances in Electrical Engineering, Jan. 9, 2014, 4 pages.
Extended European Search Report for EP Application No. 24173834.3 dated Sep. 26, 2024, 18 pages.

* cited by examiner

PIECE-WISE LINEAR CONTROL SYSTEM FOR A RESONANT CONVERTER

BACKGROUND

Technical Field

The present disclosure is directed to a piece-wise linear control system, and in particular, a piece-wise linear control system that adjusts an output power delivered to an output load of a resonant converter, such as an inductor-inductor-capacitor (LLC) converter, by tuning switching properties of the resonant converter.

Description of the Related Art

Direct Current (DC)-to-DC converters are used in electronic devices to provide different voltage outputs from a voltage supply (e.g., a battery) to different circuits or sub-circuits of an electronic device. Some conventional DC-to-DC converters operate based on storing and releasing electrical energy by using a switching method that switches power flow in the DC-to-DC converters. This technique can often achieve higher power efficiencies than conventional linear regulators. A higher power efficiency reduces heat generation of the electronic device and increases the running time of the voltage supply. The storing of electrical energy may be achieved with magnetic field energy storage components (e.g., inductors) and/or electric field storage components (e.g., capacitors), or a combination thereof.

Inductor-inductor-capacitor (LLC) converters are attractive as a type of DC-to-DC converter and facilitate many applications requiring a smooth or flat output waveform and high power density. LLC converters operate in a resonant mode in which a series capacitor and inductors resonate at a frequency defined by switching. Zero-voltage switching (ZVS) is desirable because it improves the efficiency of the LLC converters.

In order to achieve miniaturization of power supplies, the volume of magnetic components can be reduced by increasing an operational frequency of the LLC converter. However, hard switching of switches in basic switching power architectures causes switching losses, and as the operational frequency increases, the switching losses inevitably increase, resulting in an increase in the volume of heat dissipation components that are required. In order to address issues caused by hard switching, and at the same time achieve higher operational frequency and miniaturization of circuits used in such power supplies, an LLC converter having a circuit architecture with zero-voltage switching (ZVS) is widely desired.

As an output load on an LLC converter decreases, a gain curve of the LLC converter tends to be flat, so that the operational switching frequency needs increase to maintain the output voltage. When the LLC converter operates under a load state that is close to a no-load state, the gain curve is flatter. Consequently, even if the operational switching frequency is increased, the output voltage often remains unable to meet output specification requirements, in part at least due to influence of parasitic elements.

BRIEF SUMMARY

The present disclosure is directed to a control system which controls an inductor-inductor-capacitor (LLC) converter. The control of the LLC converter includes implementing a switching method that tunes the output power of the LLC converter based on the power to be supplied to an output load coupled to the LLC converter. In at least one aspect, tuning of the output power is based on changing the duty cycle of switching in a switching module of the LLC converter. In addition, the output power is adjustable by changing a frequency of switching (e.g., a switching cycle of the output of the switching module). The disclosed control system provides an LLC converter with a broad dynamic range that depends on both the duty cycle and the switching cycle of the switching. The control system is capable of adjusting both amplitude and rising slope of a current supplied to the output load by changing the duty cycle and switching cycle of the switching.

In at least one embodiment, an LLC converter according to the present disclosure includes a capacitor coupled in series with mutual inductors. A charging of the capacitor is controlled by switching of a pair of switches under control of the control system. The pair of switches controls the charging of the capacitor, where in a first period of time ($t_{on}$) a first switch is on and a second switch is off. Discharging of the capacitor is controlled in a second period of time ($t_{off}$) in which the first switch is off and the second switch is on. The capacitor is charged during $t_{on}$ and discharged during $t_{off}$. The duty cycle and switching cycle of the switching system are defined based on $t_{on}$ and $t_{off}$. The control system described herein adjusts the output voltage and current of the LLC converter, and consequently the power supplied to the output load, by tuning the time periods $t_{on}$ and $t_{off}$. The tuning of $t_{on}$ and $t_{off}$ causes different charging and discharging periods of the capacitor. By calculating the relation between the time periods $t_{on}$ and $t_{off}$ and the voltage drop across the capacitor, desired values of the output power supplied to the output load are achieved based on different combinations of resulting duty cycles and switching cycles of the switching.

BRIEF DESCRIPTION OF THE SEVERAL VIEWS OF THE DRAWINGS

Aspects of the present disclosure are best understood from the following detailed description when read with the accompanying figures. It is noted that various features are not necessarily drawn to scale.

DETAILED DESCRIPTION

Disclosed herein is a control system which controls a resonant converter, such as an inductor-inductor-capacitor (LLC) converter. The control of the LLC converter includes a switching method that tunes the output power of the LLC converter based on the required power to be supplied to an output load coupled to the LLC converter. The tuning of the output power is based on changing the duty cycle and frequency of switching (e.g., changing a switching cycle) of a switching module of the LLC converter. The disclosed control system provides the LLC converter with a broad dynamic range that depends on the duty cycle and the switching cycle of the switching. The control system is capable of adjusting amplitude and rising slope of a current supplied to the output load by changing the duty cycle and switching cycle of the switching.

Figure 1:
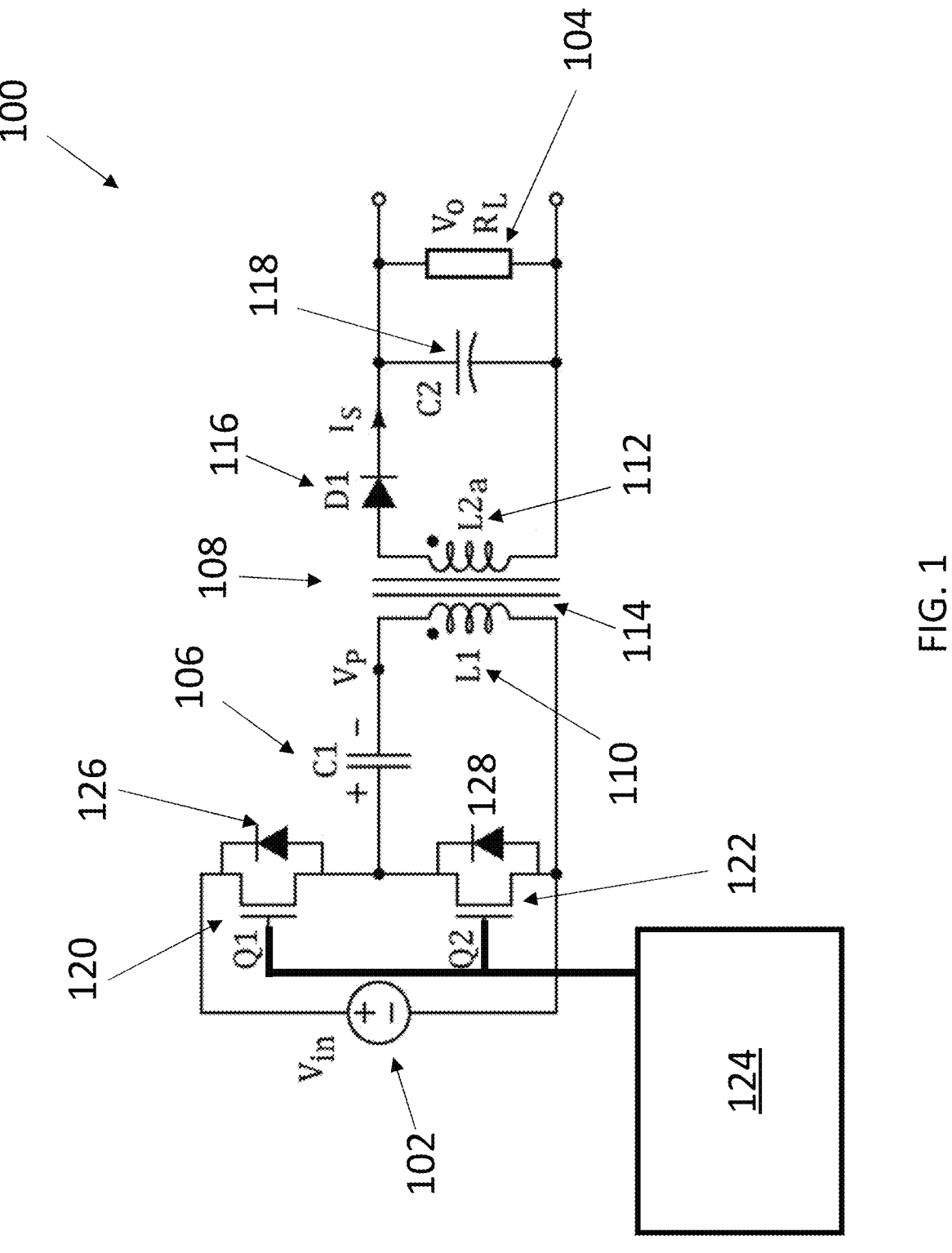
FIG. 1 depicts a circuit diagram of an inductor-inductor-capacitor (LLC) converter in accordance with one or more embodiments of the present disclosure.

FIG. 1 illustrates an LLC converter 100 receiving an input voltage Vin from a voltage supply 102 and supplying an output voltage Vo to an output load 104. In various embodiments, both the input voltage Vin and the output voltage Vo are DC (Direct Current) voltages, thus the LLC converter 100 forms a DC-to-DC converter. An output power supplied to the output load 104 depends on the output voltage Vo and an output current $I_s$ supplied to the output load 104. In various embodiments, the output load 104 may include, for example, a light unit comprising one or more LEDs, or any electrical components in a smart device such as smart phones, smart watches, laptops, etc., having a resistance $R_L$ as shown.

The present disclosure includes a control system and method that increases a dynamic range of the output power of the LLC converter 100 compared with conventional LLC converters. The dynamic range of the output power is determined by the highest and lowest output power supplied to the output load 104 that can be achieved by the highest and lowest input voltage Vin from the voltage supply 102.

In this embodiment, the LLC converter 100 includes a capacitor 106 (C1) coupled in series to mutual inductors 108. The mutual inductors 108 include a first inductor 110 (L1) coupled to a second inductor 112 (L2) through a coupling element or core 114. The first inductor 110 is coupled to the capacitor 106, and the second inductor 112 is coupled to the output load 104 by a diode 116 (D1). More particularly, an anode terminal of the diode 116 is coupled to the second inductor 112 and a cathode terminal of the diode 116 is coupled to the output load 104. An output capacitor 118 is coupled between the cathode terminal of the diode 116 and the second inductor 112, in parallel with the output load 104.

A first switch 120 (Q1) is coupled between a positive terminal of the voltage supply 102 and a first side of the capacitor 106. A second switch 122 (Q2) is coupled between a negative terminal of the voltage supply 102 and the first side of the capacitor 106. A controller 124 is coupled to the first and second switches 120 and 122 to control the on and off states of the first and second switches 120 and 122. The controller 124 is configured to control the output voltage Vo and output current Is by switching on and off the first and second switches 120, 122 using a piece-wise linear control method as described herein. In various embodiments, the controller 124 includes sensors and comparators that detect the input voltage Vin and measure the voltage and/or current of components of the LLC converter 100 as needed, to generate commands to the switches 120, 122 based on comparisons of the measured voltages and currents with desired voltage and current values that ultimately produce the desired output voltage Vo and output current $I_s$.

In general, a series LLC converter such as the LLC converter 100 is able to achieve a high dynamic range of output power by controlling the switching frequency of the first and second switches 120 and 122, while reducing the emission and leakage of the electrical power by using a zero-voltage switching (ZVS) method as described herein. In the embodiment shown in FIG. 1, the first and second switches 120 and 122 are implemented using metal-oxide-semiconductor (MOS) transistors. In other embodiments, the first and second switches 120 and 122 may be implemented by switches different than the illustrated MOS transistors. Two diodes 126 and 128 are coupled as body diodes across the first and second switches 120 and 122, respectively, to provide soft switching capability during the zero-voltage switching process. The switching frequency of the first and second switches 120 and 122 determines, at least in part, the output power delivered to the output load 104 based on the input voltage Vin.

Figure 2:
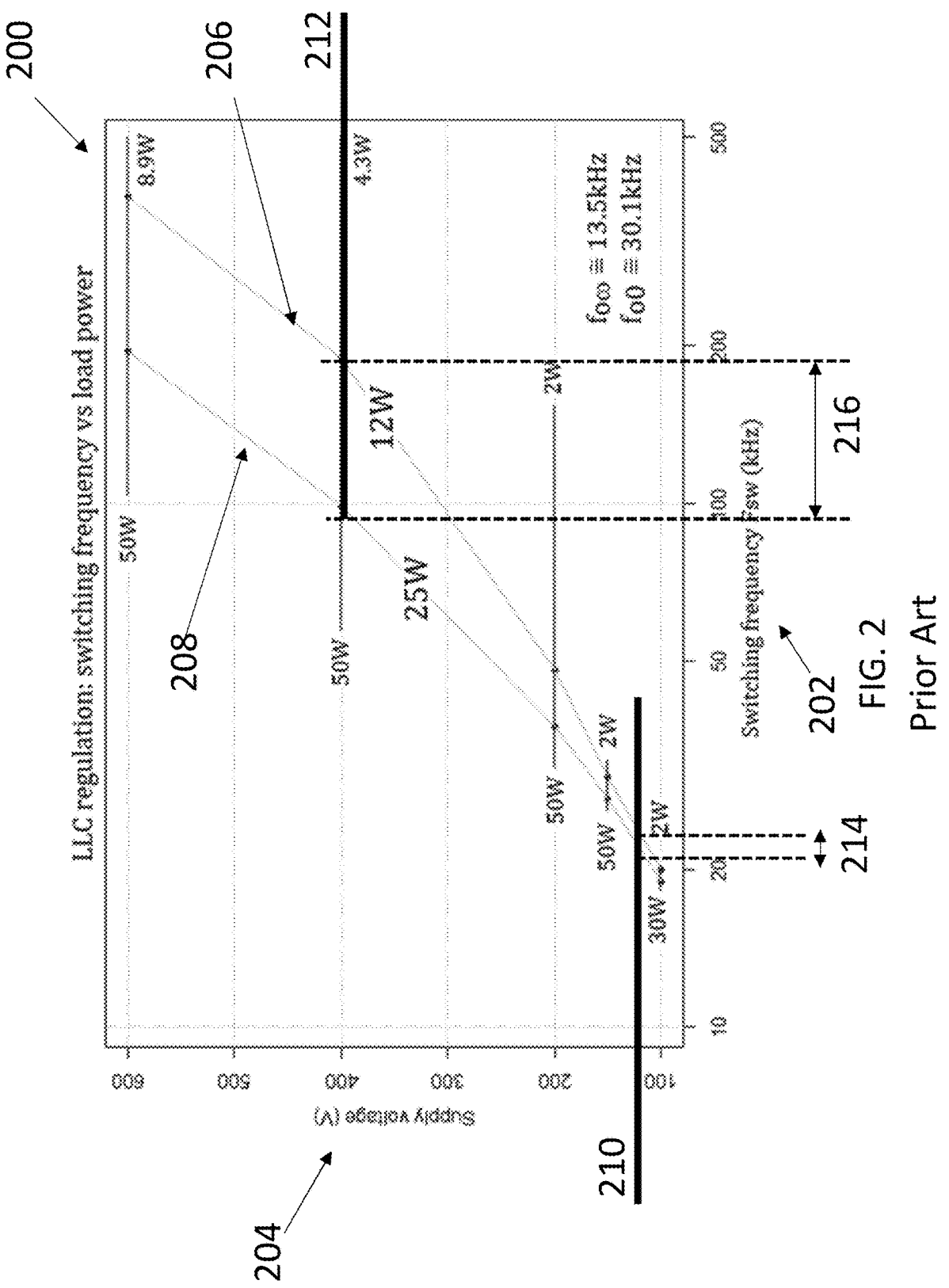
FIG. 2 depicts a diagram of LLC regulation comprising a switching frequency versus load power in a conventional LLC converter.

FIG. 2 is a diagram 200 which depicts different switching ranges that are required for adjusting the switching frequency of a conventional LLC converter that, based on the input voltage, provide a desired output power to an output load. In this diagram, the horizontal axis 202 represents the switching frequency in kilohertz (KHz) and the vertical axis 204 represents the input voltage in volts (V). A first line 206 represents an output power of 12 W (watts) supplied to the output load and a second line 208 represents an output power of 25 W supplied to the output load. The diagram 200 shows that, when increasing the input voltage (on the vertical axis 204), the switching frequency (on the horizontal axis 202) should be increased to deliver the same amount of output power (e.g., either 12 W or 25 W in this example) to the output load.

However, using a conventional switching method having a constant duty cycle of 50%, the range for changing switching frequency to achieve a regulated output of the LLC converter at different input voltages is not a linear relation. For example, the horizontal distance (range of change of the switching frequency required) between the first and second lines 206, 208 at a lower input voltage (e.g., 136 V) is much less than the horizontal distance (range of change of the switching frequency required) between the first and second lines 206, 208 at a higher input voltage (e.g., 400V). As a result, for example, a first input voltage 210 and a second input voltage 212 are indicated in the diagram 200, where the first input voltage 210 is less than the second input voltage 212. When the input voltage is a lower amount, e.g., at 210, a change of switching frequency over a very narrow range 214 produces a large change of delivered output power, e.g., between 12 W (the first line 206) and 25 W (the second line 208). In the same circuit arrangement, when the input voltage is higher, e.g., at 212, a wider range 216 of switching frequency control produces the change of the delivered output power between 12 W and 25 W. From the diagram 200, it is clear that the frequency range 216 required for regulation of the LLC converter at higher input voltages is greater than the frequency range 214 required for regulation of the LLC converter at lower input voltages. Using a conventional switching method for the LLC converter in this example, when the input voltage 210 is equal to 136 V, the frequency range 214 for control of the output power is only a few KHz (e.g., less than 10 KHz), but when the input voltage 212 is equal to 400 V, the frequency range 216 for control of the output power is much greater (e.g., about 100 KHz). This produces a nonlinear behavior in which, as the input voltage increases and the output power decreases, increasingly wider control bandwidths are needed for regulation of the LLC converter, and this limits the dynamic range of the LLC converter to deliver the desired output power to the output load for a wide range of input voltages.

In some examples, for an input voltage less than 100 V, the conventional switching method is not capable of regulating the desired output power to the output load by changing the switching frequency. At such a low input voltage, a small change of the switching frequency results in a large change of the output power. On the other hand, for an input voltage of about 600 V, the conventional switching method is not capable of providing the desired output power to the output load at a low power (e.g., 2 W) by changing the switching frequency, since providing a low output power, e.g., 2 W, requires a switching frequency outside of the range of control of the circuit components. Providing a wide range of switching frequency control requires complicated frequency generation methods which causes further technical limits in the switching process (e.g., an operational frequency limit of the circuit components such as the switches and interference from parasitic behavior of the electrical components in the LLC converter).

To analyze the reasons for the above-noted limitation arising from conventional switching methods, a State Space Averaging (SSA) model may be used. Using an SSA model, and an assumption of steady state operation of an LLC converter, e.g., of the type illustrated in FIG. 1, a rising slope of the output current Is can be plotted such as in a diagram 300 shown in FIG. 3. The diagram 300 depicts a relation between the input voltage Vin and the rising slope of the output current $I_s$ when the duty cycle of switching is 50%. In this example, the horizontal axis 302 represents the input voltage Vin (V) and the vertical axis 304 represents the rising slope of the output current $I_s$ ($dI_s/dt$). A line 306 represents change in the rising slope of the output current $I_s$ at different values of the input power Vin. The diagram 300 shows that, by increasing the input voltage Vin (the horizontal axis 302), the rising slope of the output current $I_s$ (the vertical axis 304) is increased. The change in the rising slope of the output current $I_s$ is nonlinear for lower input voltages (e.g., below 200 V), while the increase for higher input voltages (e.g., higher than 200 V) is approximately linear. The increase in the rising slope of the output current $I_s$ limits the dynamic range of the LLC converter. This is an inherent limitation of an LLC converter such as the LLC converter 100 in FIG. 1. The higher rising slope of the output current $I_s$ at higher input voltages Vin limits the ability to deliver a regulated output power at a low power requirement (e.g., 2 W).

Figure 3:
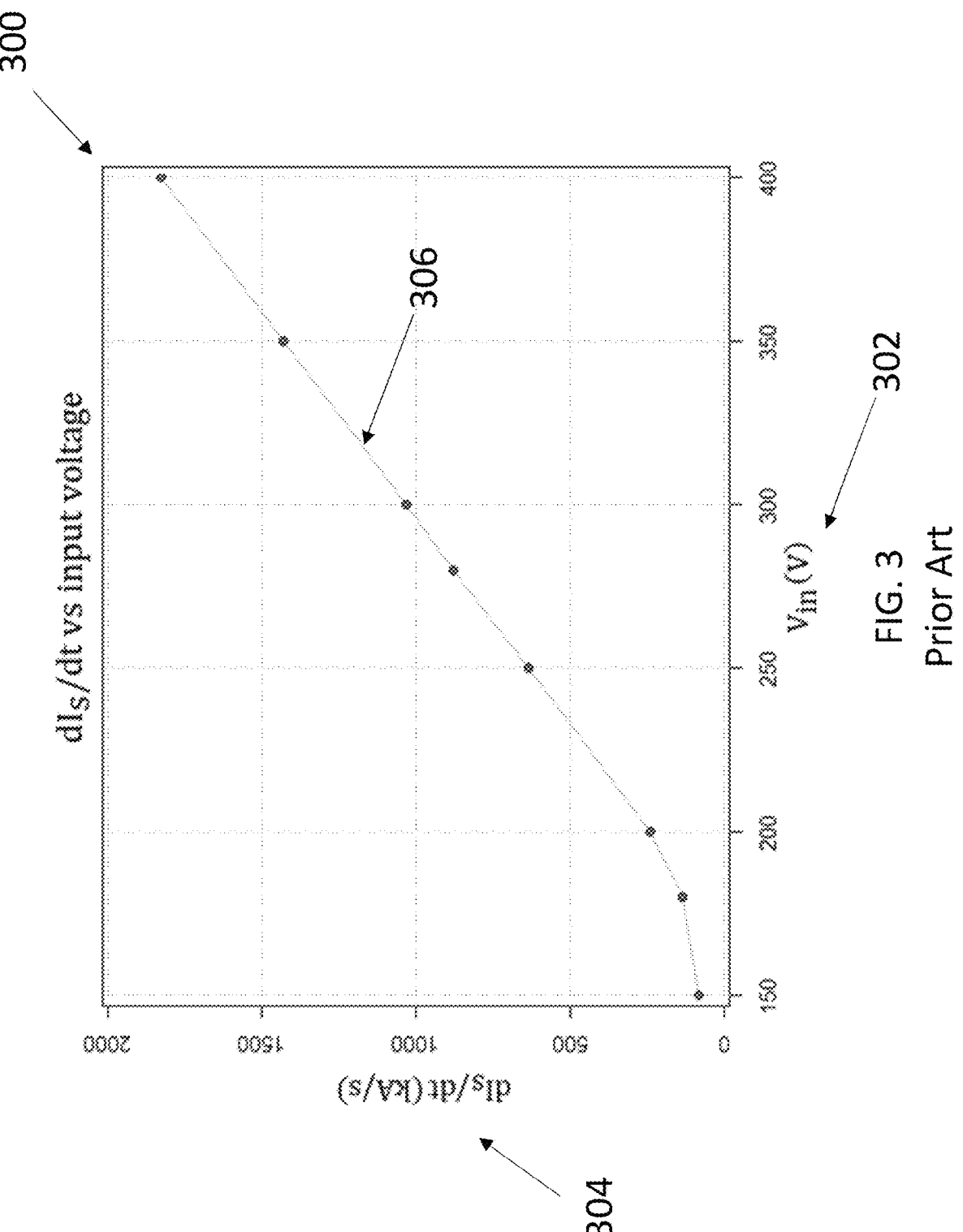
FIG. 3 depicts a diagram of a change in rising slope of an output current versus input voltage in a conventional LLC converter.
Figures 4A, 4B:
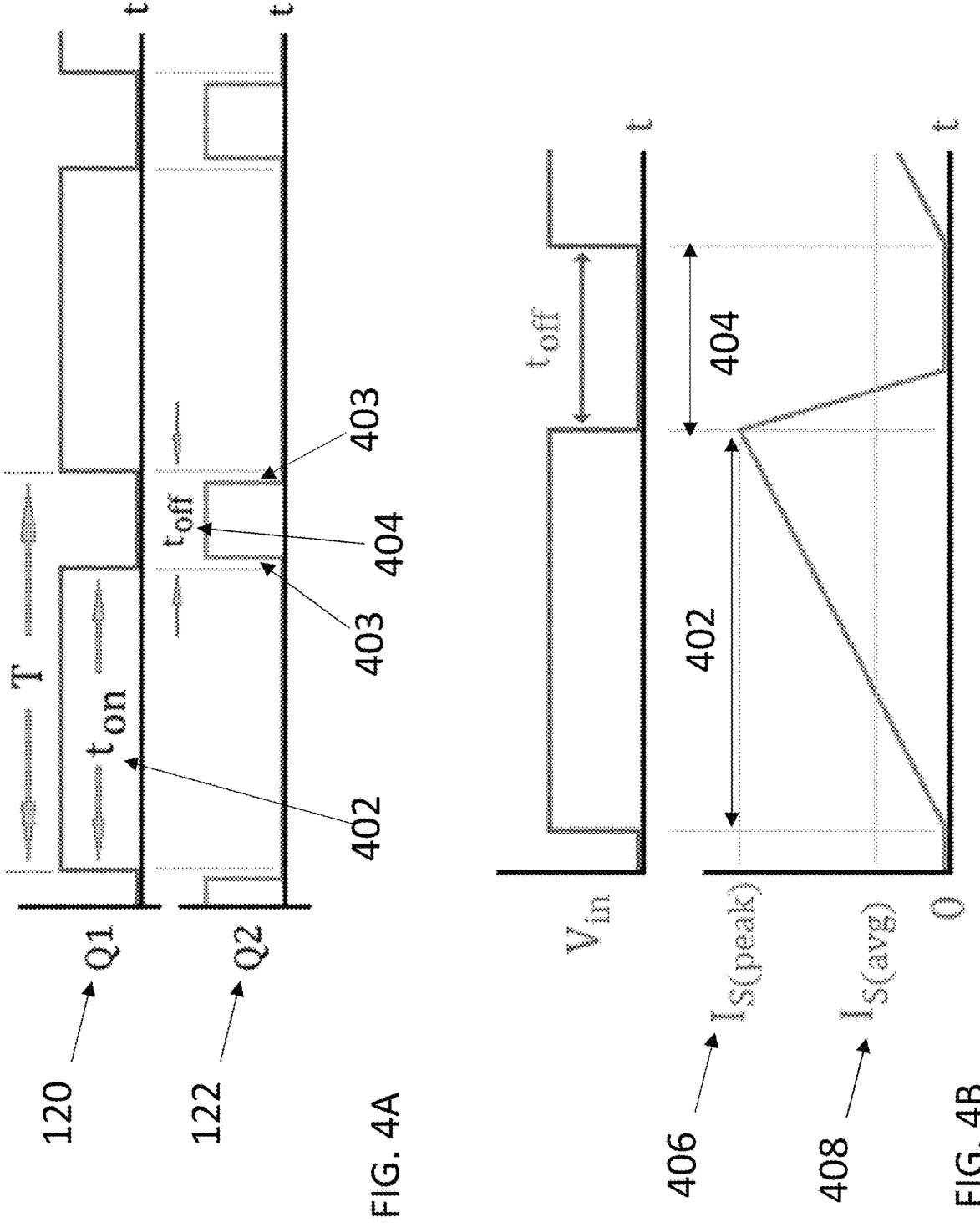
FIG. 4A depicts switching states of the switches in the circuit diagram in FIG. 1, in accordance with one or more embodiments of the present disclosure.
FIG. 4B depicts switching states and output current of the circuit diagram in FIG. 1, in accordance with one or more embodiments of the present disclosure.

The present disclosure provides a switching method that overcomes the limitations described above for conventional switching shown in diagrams 200 and 300 of FIGS. 2 and 3. To describe the switching method of the present disclosure, it is useful to further analyze the operation of the LLC converter 100 in FIG. 1. FIG. 4A shows an example of switching states of the first and second switches 120, 122 of the LLC converter 100 in FIG. 1. The horizontal axis represents time and the vertical axis represents a logical state of the first and second switches 120, 122. In this embodiment, a first period of time 402 ($t_{on}$) represents a positive cycle in which the controller 124 turns on the first switch 120 while turning off the second switch 122. A second period of time 404 ($t_{off}$) represents a negative cycle in which the controller 124 turns on the second switch 122 while the first switch 124 is turned off. In some embodiments, due to a ZVS operation of the switching, a small third amount of time 403 adjacent to the second period of time 404 may be provided in which both the first and second switches 120, 122 are turned off, enabling discharge of capacitive electrical charges on the switching components. This third amount of time 403 is much smaller than the first and second time periods 402, 404. A combination of the first and second period of time 402 and 404, and in some cases the third amount of time 403, essentially determines a switching cycle (T) that is repeated based on the desired switching frequency (f=1/T). The duty cycle (D) of the switching is determined based on a ratio of the first period of time 402 ($t_{on}$) and the switching cycle (T). The duty cycle ($t_{on}/T$) can be defined as a number between 0 and 1 or based on a percentage between 0% and 100%. For instance, in a steady state which the first period of time 402 is the same as the second period of time 404, the duty cycle is equal to 0.5 or 50%.

Referring to FIG. 1, the voltage Vp across the first inductor 110 is inductively coupled to the second inductor 112 to generate the output current $I_s$ and deliver the output voltage Vo to the output load 104. The voltage Vp depends on the voltage (Vc) across the capacitor 106 and the input voltage 102 (Vin). In this condition, the voltage Vp can be calculated by Vp=Vin−Vc. Based on a capacitor charge balance concept, the voltage Vc is approximately constant over the switching cycle (T). During the first period of time 402, the first switch 120 is turned on, the second switch 122 is turned off, and the capacitor 106 is charging. During the second period of time 404, the first switch 120 is turned off, the second switch 122 is turned on, and the capacitor 106 is discharging, e.g., through a loop created by the second switch 122 and the first inductor 110. Hence, considering the capacitor charge balance, the voltage Vc depends on the duty cycle (D) of the switching and can be determined as Vc=D*Vin. Consequently, the voltage Vp can be calculated as Vp=(1−D)*Vin. The output voltage and power delivered to the output load 104 depends on the voltage Vp, thus the output power is controllable by the duty cycle (D) of the switching. In the output side of the LLC converter 100, the diode 116 converts a secondary voltage across the second inductor 112 to a half wave rectified voltage, which is provided as the output voltage Vo to the output load 104.

FIG. 4B depicts a relation between the output current $I_s$ and the first and second periods of time 402, 404 as described in FIG. 4A. During the first period of time 402, the capacitor 106 is charging and the voltage Vp is increasing, thus the output current $I_s$ is increasing to a peak value 406. During the second period of time 404, the capacitor 106 is discharging and the voltage Vp is decreasing, thus the output current $I_s$ is decreasing, to a zero value in the example shown. An average value 408 of the output current $I_s$ can be calculated based on the peak value 406 and the charging and discharging of the capacitor 106 during the first and second periods of time 402, 404. As described above, the voltage of the capacitor 106 depends on the duty cycle (D) of the switching, and consequently, the average value 408 of the output current $I_s$ is tunable by controlling the duty cycle (D) of the switching. The rising slope of the output current $I_s$ ($dI_s/dt$) is also tunable by controlling the duty cycle (D) of the switching.

FIG. 4B shows that the output current $I_s$ can be increased by increasing the first period of time 402 and can be decreased by increasing the second period of time 404, while maintaining a constant switching frequency. However, increasing the duty cycle (D) reduces the rising slope of the output current $I_s$ ($dI_s/dt$). Hence, in the present disclosure, the controller 124 is configured to adjust both the duty cycle (D) of the switching and the frequency of the switching to overcome the limitation of conventional LLC converters by controlling the rising slope of the output current $I_s$ ($dI_s/dt$). The controller 124 controls the duty cycle (D) and the frequency of the switching, which results in two degrees of freedom for adjusting the output power delivered to the output load 104.

Figure 5:
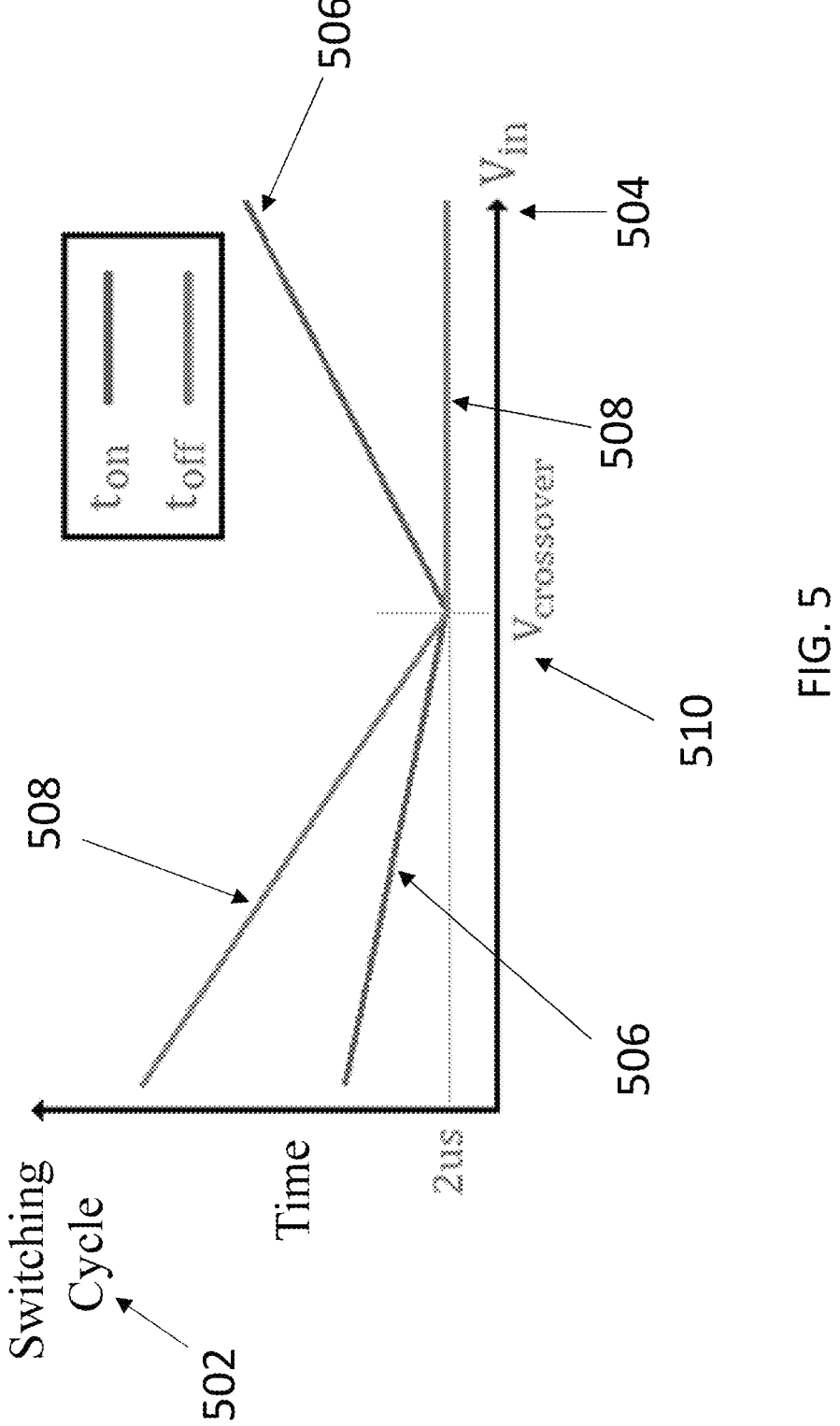
FIG. 5 depicts a diagram of a piece-wise linear control of the circuit diagram in FIG. 1, in accordance with one or more embodiments of the present disclosure.

FIG. 5 depicts a method of piece-wise linear control of the switching of the LLC converter 100 described in FIG. 1. The control method described in FIG. 5 is based on adjusting the first and second periods of time 402, 404 (i.e., the respective duty cycle (D)) of the switching described in FIGS. 4A-4B, for different values of the input voltage Vin. In FIG. 5, the vertical axis 502 represents duration of time (switching cycle) and the horizontal axis 504 represents input voltage (Vin). A first graph 506 represents the first period of time 402 ($t_{on}$) described in FIGS. 4A-4B and a second graph 508 represents the second period of time 404 ($t_{off}$) described in FIGS. 4A-4B. The first and second graphs 506, 508 represent two linear control regions, wherein the first linear control region is operative when the input voltage is lower than a crossover voltage 510 and the second linear control region is operative when the input voltage is higher than the crossover voltage 510. Unlike conventional switch-mode controllers, the controller 124 employs a piece-wise linear control method that controls the first and second periods of time 402, 404, according to the first and second linear control regions that meet at the crossover voltage 510. The crossover voltage 510 is thus a threshold voltage, and the control method described herein achieves a piece-wise linear control of the LLC converter 100 in a manner that enhances the overall dynamic range of the LLC converter 100.

At the crossover voltage 510, the lengths of the first and second periods of time 402, 404 are equal, and consequently, the duty cycle (D) of the switching is 50%. When the input voltage Vin increases above the crossover voltage 510, the length of the first period of time 402 ($t_{on}$) increases as shown by the first graph 506 while the length of the second period of time 404 ($t_{off}$) as shown by the second graph 508 remains constant or approximately constant. Hence, at input voltages higher than the crossover voltage 510, the duty cycle (D) of the switching increases higher than 50% and the switching cycle (T) increases. At the crossover voltage 510, the period of time (switching cycle) 502 is at a minimum switching cycle threshold. The minimum switching cycle threshold may be regarded as a minimum switching cycle for $t_{on}$ and $t_{off}$ that is determined, at least in part, by physical operational constraints of the LLC converter and a maximum switching frequency of the switching system. In some embodiments, for example, the minimum switching cycle threshold is about 2 μs. In other words, the length of each of the first and second periods of time 402, 404 may not be lower than the minimum switching cycle threshold due to limitations of the switching system.

When the input voltage Vin decreases lower than the crossover voltage 510, the length of both of the first period of time 402 ($t_{on}$) as shown by the first graph 506 and the second period of time 404 ($t_{off}$) as shown by the second graph 508 are increased, with the length of the second period of time 404 ($t_{off}$) increasing at a higher rate than the length of the first period of time 402 ($t_{on}$). Decreasing the input voltage Vin causes the output current to decrease. Thus, to compensate for the output current reduction, the length of the first period of time 402 ($t_{on}$) is increased.

The piece-wise linear control method demonstrated in FIG. 5 shows that delivery of different output power to the output load 104 of the LLC converter 100 in FIG. 1 is possible by changing the duty cycle (D) and the lengths of the first and/or second periods of time 402, 404 ($t_{on}$ and $t_{off}$) described in FIGS. 4A-4B. In addition, changing the lengths of the first and second periods of time 402, 404 controls the output current $I_s$ as well as the rising slope of the output current $I_s$ ($dI_s/dt$). The piece-wise linear control as disclosed herein overcomes the limitations of conventional LLC converters which do not have a wide dynamic range of operation due to the limited ability to adjust the frequency of the switching and the high rising slope of the output current $I_s$ ($dI_s/dt$), as described with respect to FIGS. 2 and 3.

The crossover voltage 510 can be determined based, at least in part, on the output power to be delivered to the output load 104 of the LLC converter 100 in FIG. 1. For instance, for a switching system operating with the piece-wise linear control described in FIG. 5 and having a low switching cycle threshold at 2 μs when the duty cycle is 50%, the crossover voltage 510 is about 312 V for delivering 5 W output power, about 428 V for delivering 10 W output power, and 640 V for delivering 20 W output power, in at least one example. The crossover voltage 510 may be different for different LLC converters and can be modified based on the design of the LLC converter. In the above example, if the input voltage is decreased from 428 V to 350 V for delivering 10 W of output power, then the length of both of the first period of time 402 ($t_{on}$) as shown by the first graph 506 and the second period of time 404 ($t_{off}$) as shown by the second graph 508 increase to deliver the desired 10 W output power to the output load 104. In this example, the length of the first period of time 402 ($t_{on}$) may be increased to 2.2 us while the length of the second period of time 404 ($t_{off}$) is increased greater than 2.2 μs.

In some embodiments, the delivered output power is adjustable for different output loads 104 (e.g., from lighter to heavier loads 104) by tuning the duty cycle (D) of the switching. For instance, for delivering greater output power while the input voltage Vin is below the crossover voltage 510, the length of the second period of time 404 ($t_{off}$) may be increased as shown.

Figure 6:
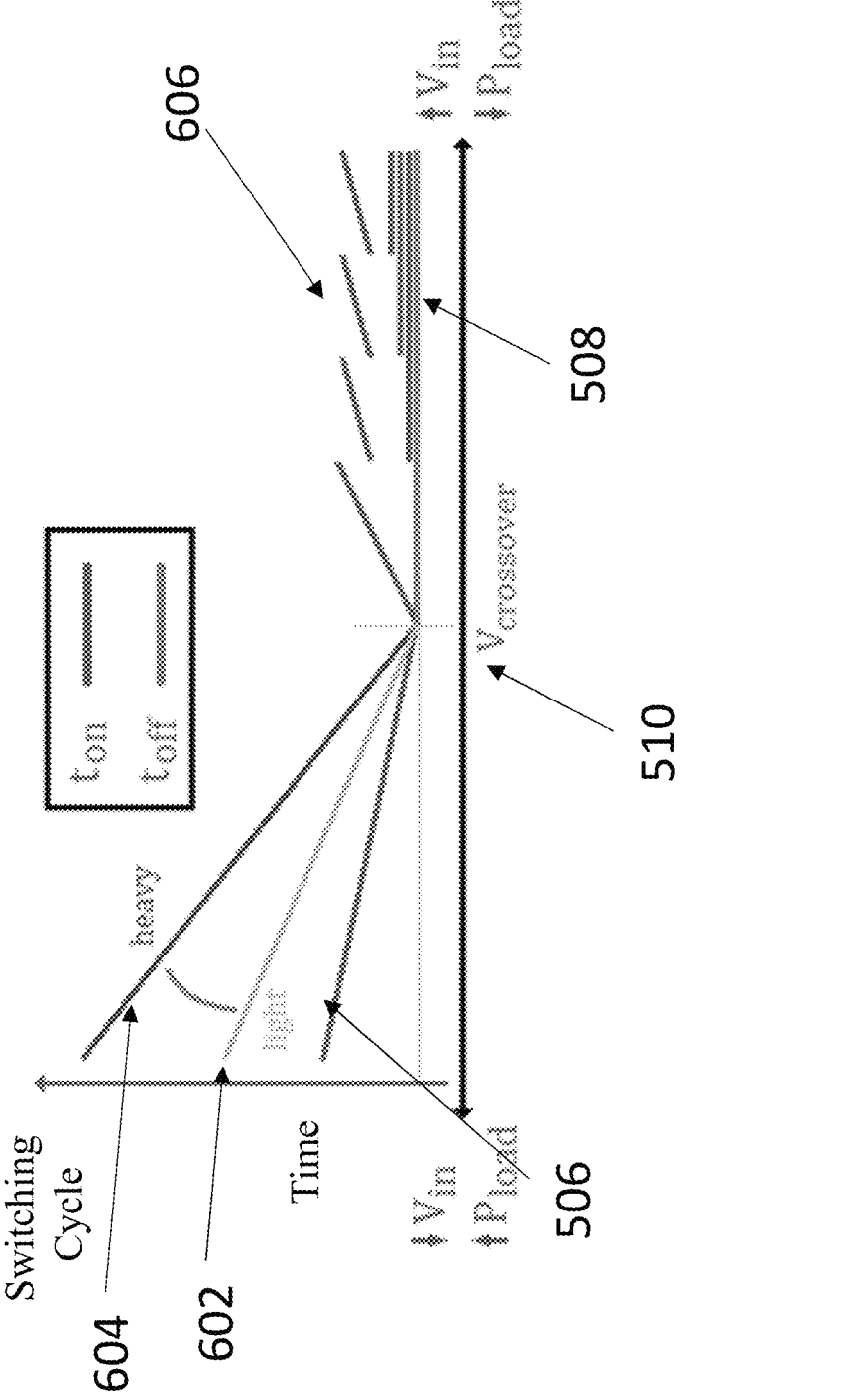
FIG. 6 depicts another diagram of a piece-wise linear control of the circuit diagram in FIG. 1, in accordance with one or more embodiments of the present disclosure.

FIG. 6 depicts a graph that is similar in nature to the graph depicted in FIG. 5 in that FIG. 6 depicts another diagram of a piece-wise linear control of the circuit diagram in FIG. 1. In the region below the crossover voltage 510 in the diagram of FIG. 6, the rate of increasing of the length of the second period of time 404 ($t_{off}$) may be increased from a first rate illustrated by line 602 to a second rate illustrated by line 604 having greater slope than the first line 602. In this embodiment, the greater rate of increasing the length of the second period of time 404 ($t_{off}$) provides a greater output power to a heavier (greater) output load as compared to the power to be delivered to a lighter (lower) output load, as shown by the first line 602.

In some embodiments, increasing the length of the first period of time 402 ($t_{on}$) when the input voltage is above the crossover voltage 510 causes an excessive circulating current in the LLC converter 100 described in FIG. 1, which inhibits proper operation of the LLC converter 100. A further embodiment of a piece-wise linear control method of the present disclosure is demonstrated in FIG. 6, which overcomes the excessive circulating current limitation. In this embodiment, the first period of time 402 ($t_{on}$) is split into multiple pulses as depicted by discontinuous lines 606 while the second period of time 404 ($t_{off}$) remains constant corresponding to the graph 508 in FIG. 5. While the input voltage Vin is greater than the crossover voltage 510, the splitting of the first period of time 402 ($t_{on}$) into multiple pulses decreases the circulating current. Although the increase in the first period of time 402 ($t_{on}$) corresponding to an increased input voltage is split into discontinuous lines 606 (representing, for example, dividing $t_{on}$ into 2, 3, 4 or more pulses), the duty cycle (D) of the switching may remain the same. The pulse widths of the individual pulses that make up the first period of time 402 ($t_{on}$) add up to provide the high-side portion of the duty cycle (D) This embodiment of a piece-wise linear control method results in reducing power losses otherwise due to an excessive circulating current.

Figure 7:
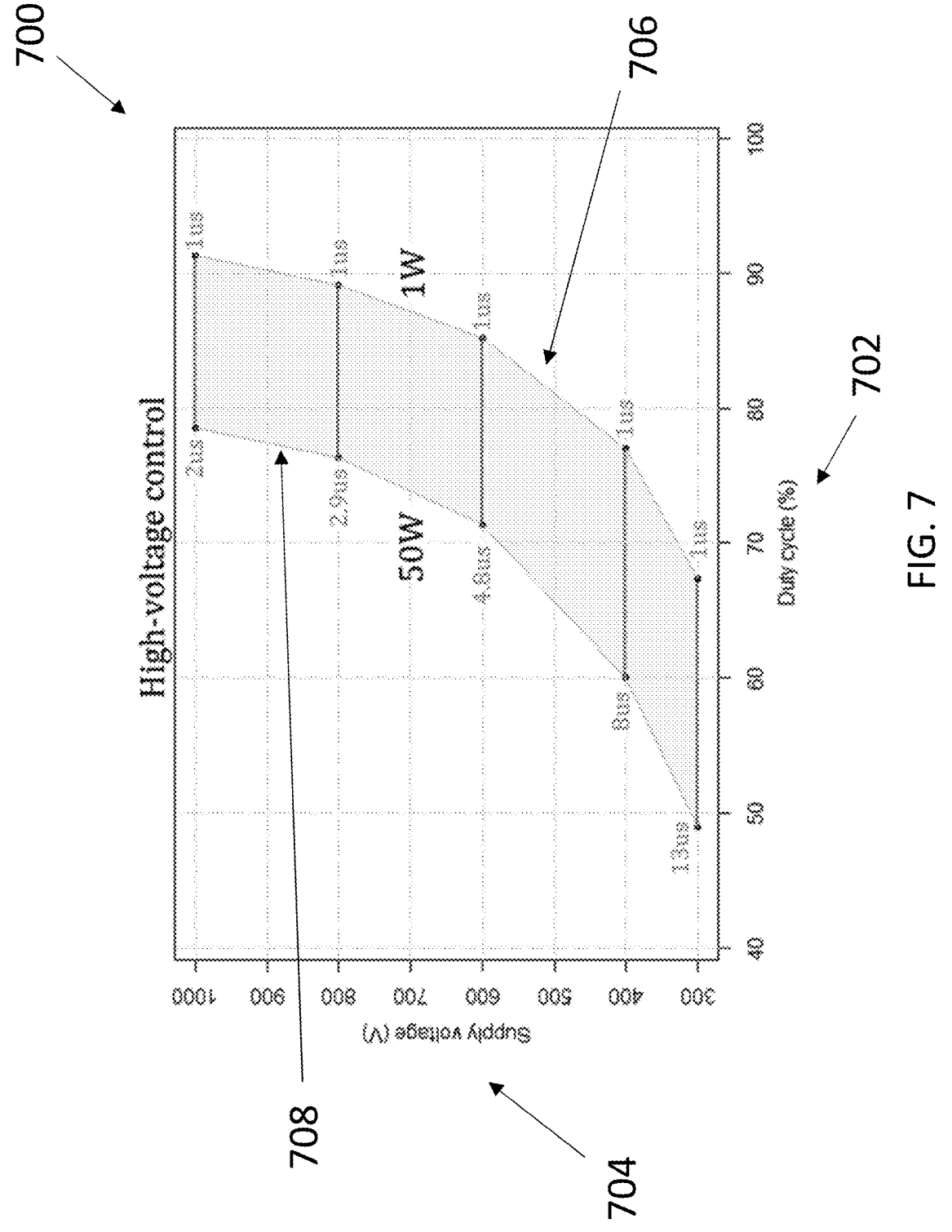
FIG. 7 depicts a diagram of control range for high-voltage regulation in an LLC converter using a piece-wise linear control in accordance with one or more embodiments of the present disclosure.

FIG. 7 is a diagram 700 which depicts different switching ranges that are required for adjusting the duty cycle (D) of the LLC converter 100 described in FIG. 1, based on the input voltage Vin to provide a desired output power to the output load 104 of the LLC converter 100 and using the piece-wise linear control methods demonstrated in FIGS. 5 and 6. In this embodiment, the horizontal axis 702 represents the duty cycle (D) of the switching in percentage (%) and the vertical axis 704 represents the input supply voltage in volts (V). A first line 706 represents a lower output power of, for example, 1 W (watt) supplied to the output load 104, and a second line 708 represents a higher output power of, for example, 50 W supplied to the output load 104. The diagram 700 shows that, when increasing the input voltage (on the vertical axis 704), the duty cycle (D) of the switching (on the horizontal axis 702) should be increased for delivering a same amount of output power (e.g., either 1 W or 50 W in this embodiment) to the output load 104. Comparing the diagram 700 with the diagram 200 of FIG. 2 that represents a conventional switching method, using the piece-wise linear control method of the present disclosure enables the LLC converter 100 to have a much wider range of control of the duty cycle to regulate the operation of the LLC converter 100 and deliver the desire output power (e.g., 1 W-50 W) by changing the duty cycle (D). This is particularly valuable when regulating operation of the LLC converter 100 at lower input voltage (comparing, for example, a much wider range of control at a low input voltage in FIG. 7 using a variable duty cycle versus a much narrower range of control at a low input voltage in FIG. 2 using a variable switching frequency). The diagram 700 also shows a relatively constant range of control for driving the desired output power even when the input voltage Vin is increased over 600 V.

High-voltage regulation the LLC converter 100 is achieved using a combination of varying the duty cycle and the switching cycle. FIG. 7, in particular, shows a control range for input voltages from 300V to 1000V, with load power from 1 W to 50 W (depicted by lines 708, 708). In this example, times are indicated for second period of time 404 ($t_{off}$) of each switching cycle to achieve the desired output power at the different input voltages. By contrast, a conventional LLC converter having the same component values could only regulate the output power down to 9 W at 600V, and could not regulate the output power at 1000V due to high currents. The LLC converter 100 using the piece-wide linear control method described herein achieves output regulation for 1 to 50 W even with input voltages beyond 1000V.

The following summarizes various aspects and features of the systems and method described herein.

In at least one embodiment, described herein is a system that includes an input terminal configured to receive an input voltage from a voltage supply, an output terminal configured to deliver an output power to an output load, a resonant converter configured to convert the input voltage to an output voltage that provides the output power to the output load, first and second switches coupled between the input terminal and the resonant converter, and a controller coupled to the first and second switches. The controller is configured to switch on the first switch and switch off the second switch for a first period of time, wherein the first switch conducts a first current between a positive terminal of the voltage supply and the resonant converter. The controller is further configured to switch off the first switch and switch on the second switch for a second period of time, wherein the second switch conducts a second current between a negative terminal of the voltage supply and the resonant converter. Optionally, the controller is also configured to switch off the first switch and the second switch for a third period of time.

The controller is configured to control the duration of the first period of time, the second period time, and the third period of time according to the input voltage and a target value for the output power according to a power requirement of the output load. In at least one aspect, the first period of time is equal to the second period of time in response to the input voltage being equal to a crossover voltage of a piece-wise linear control method of the controller. In another aspect, the first period of time is greater than the second period of time in response to the input voltage being less than the crossover voltage, and in another aspect the first period of time is less than the second period of time in response to the input voltage being greater than the crossover voltage. The crossover voltage is determined based at least in part on the output load.

Optionally, the resonant converter is a series inductor-inductor-capacitor (LLC) circuit including a capacitor. The capacitor includes a first terminal coupled to a common node of the first and second switches and a second terminal coupled to mutual inductors, and the output load is coupled to the mutual inductors by a diode.

Optionally, the first and second switches operate in a zero voltage switching mode.

Optionally, a duty cycle of the first and second switches is 50% at the crossover voltage, and the duty cycle is proportional to a ratio between the first period of time and the second period of time.

Optionally, the controller is further configured to increase the output power to the output load by increasing the duty cycle.

Optionally, the controller is further configured to reduce a rising slope of an output current to the output load by increasing the duty cycle.

Optionally, a peak of the output current is proportional to the first period of time and the duty cycle of the first and second switches.

Optionally, the first period of time is about 2 us in response to the switching frequency being 250 kHz.

Optionally, the output power delivered to the output load is in a range of about 1 W to about 50 W when the input voltage is in a range of about 300 V to about 1000 V.

In at least one embodiment, described herein is a method that includes charging a capacitor by switching on a first switch and switching off a second switch for a first period of time, wherein the first switch conducts a first current from a positive terminal of a voltage supply to a resonant converter, and the resonant converter is configured to generate an output voltage and an output current coupled to an output load; discharging the capacitor by switching on the second switch and switching off the first switch for a second period of time, wherein the second switch conducts a second current from the resonant converter to a negative terminal of the voltage supply; and switching off the first and second switches for a third period of time. The duration of the first, second, and third periods of time is controlled by a controller according to an input voltage of the voltage supply and a target output power according to a power requirement of the output load. A peak of the output current is proportional to the first period of time and a duty cycle of the first and second switches.

Optionally, the method further includes increasing the output power to the output load by increasing the duty cycle of the input voltage.

Optionally, the method further includes reducing a rising slope of an output current to the output load by increasing the duty cycle.

Optionally, the method further includes increasing the second period of time to keep the output power at a constant value when the input voltage is decreased below a crossover voltage of a piece-wise linear control method implemented by the controller, wherein the crossover voltage is determined based at least in part on the output power delivered to the output load.

Optionally, the method further includes increasing the first period of time if the output power to be delivered to the output load is increased.

Optionally, a rate of increasing the second period of time is greater than a rate of increasing the first period of time when the input voltage is decreased below the crossover voltage.

Optionally, the method further includes splitting the first period of time into multiple pulses to keep the output power at a constant value when the input voltage is increased above the crossover voltage and the second period of time remains constant.

In at least one embodiment, described herein is a method of voltage regulation. The method includes determining, by a controller, an input voltage of a voltage regulator and an output power to be delivered to an output load coupled to the voltage regulator, and determining, by the controller, a switching frequency and a duty cycle of a switching module based on the input voltage, and a target value of the output power to be delivered to the output load. The duty cycle is proportional to first and second periods of times in which different switches in the switching module are switched on, the switches being coupled between the input voltage and a resonant converter, and the resonant converter being coupled to the output load to convert the input voltage to an output voltage that provides the output power. The first period of time is controlled to be greater than the second period of time in response to the input voltage being greater than a crossover voltage, and the first period of time is controlled to be less than the second period of time in response to the input voltage being less than the crossover voltage. The crossover voltage is determined based at least in part on the output power to be delivered to the output load.

Optionally, the duty cycle is adjusted to 50% when the input voltage is equal to the crossover voltage.

Optionally, the method further includes increasing the output power and reducing a rising slope of an output current to the output load by increasing the duty cycle, while keeping the second period of time at a constant value, when the input voltage is greater than the crossover voltage.

Optionally, the method further includes increasing the second period of time to keep the output power at a constant value, the first period of time is increased at a lower rate than the second period of time, when the input voltage is less than the crossover voltage.

Optionally, the method further includes splitting the first period of time into multiple pulses to keep the output power closer to a constant value when the input voltage is increased above the crossover voltage.

It will be appreciated that the various embodiments described above can be combined to provide further embodiments of the disclosed invention.

These and other changes can be made to the embodiments in light of the above-detailed description.

In general, in the following claims, the terms used should not be construed to limit the claims to specific embodiments disclosed in the specification and the claims, but should be construed to include all possible embodiments along with the full scope of equivalents to which such claims are entitled.

The invention claimed is:

1. A system, comprising:

an input terminal configured to receive an input voltage from a voltage supply;

an output terminal configured to deliver an output power to an output load;

a resonant converter configured to convert the input voltage to an output voltage that provides the output power to the output load;

first and second switches coupled between the input terminal and the resonant converter; and a controller coupled to the first and second switches, wherein the controller is configured to:

during a first period of time, switch on the first switch and switch off the second switch, wherein the first switch conducts a first current between a positive terminal of the voltage supply and the resonant converter;

during a second period of time, switch off the first switch and switch on the second switch, wherein the second switch conducts a second current between a negative terminal of the voltage supply and the resonant converter; and the first period of time and the second period of time comprising a switching cycle, wherein the controller is configured to control the duration of the first period of time and the second period time according to the input voltage and a target value for the output power according to a power requirement of the output load, wherein:

the first period of time is equal to the second period of time in response to the input voltage being equal to a crossover voltage of a piece-wise linear control method of the controller, the first period of time is less than the second period of time in response to the input voltage being less than the crossover voltage, and the first period of time is greater than the second period of time in response to the input voltage being greater than the crossover voltage, wherein the crossover voltage is determined based at least in part on the output load.

2. The system of claim 1, wherein:

the resonant converter is a series inductor-inductor-capacitor (LLC) circuit including a capacitor, the capacitor includes a first terminal coupled to a common node of the first and second switches and a second terminal coupled to mutual inductors, and the output load is coupled to the mutual inductors by a diode.

3. The system of claim 1, wherein the first and second switches operate in a zero voltage switching mode in which during a third period of time, the controller is configured to switch off the first switch and the second switch, and wherein the controller is configured to control the duration of the first period of time, the second period time, and the third period of time according to the input voltage and the target value for the output power.

4. The system of claim 1, wherein a duty cycle of the first and second switches is 50% at the crossover voltage, and the duty cycle is proportional to a ratio between the first period of time and the second period of time.

5. The system of claim 4, wherein the controller is further configured to increase the output power to the output load by increasing the duty cycle.

6. The system of claim 5, wherein the controller is further configured to reduce a rising slope of an output current to the output load by increasing the duty cycle.

7. The system of claim 6, wherein a peak of the output current is proportional to the first period of time and the duty cycle of the first and second switches.

8. The system of claim 7, wherein the first period of time is about 2 µs in response to a switching frequency of 250 kHz.

9. The system of claim 1, wherein the output power delivered to the output load is in a range of about 1 W to about 50 W when the input voltage is in a range of about 300 V to about 1000 V.

10. A method, comprising:

charging a capacitor by switching on a first switch and switching off a second switch for a first period of time, wherein the first switch conducts a first current from a positive terminal of a voltage supply to a resonant converter, and the resonant converter is configured to generate an output voltage and an output current coupled to an output load;

discharging the capacitor by switching on the second switch and switching off the first switch for a second period of time, wherein the second switch conducts a second current from the resonant converter to a negative terminal of the voltage supply; and switching off the first and second switches for a third period of time, wherein the duration of the first, second, and third periods of time is controlled by a controller according to an input voltage of the voltage supply and a target output power according to a power requirement of the output load, and wherein a peak of the output current is proportional to the first period of time and a duty cycle of the first and second switches.

11. The method of claim 10, further comprising increasing the output power to the output load by increasing the duty cycle of the input voltage.

12. The method of claim 10, further comprising reducing a rising slope of an output current to the output load by increasing the duty cycle.

13. The method of claim 10, further comprising increasing the second period of time to keep the output power at a constant value when the input voltage is decreased below a crossover voltage of a piece-wise linear control method implemented by the controller, wherein the crossover voltage is determined based at least in part on the output power delivered to the output load.

14. The method of claim 13, further comprising increasing the first period of time if the output power to be delivered to the output load is increased.

15. The method of claim 14, wherein a rate of increasing the second period of time is greater than a rate of increasing the first period of time when the input voltage is decreased below the crossover voltage.

16. The method of claim 13, further comprising splitting the first period of time into multiple pulses to keep the output power at a constant value when the input voltage is increased above the crossover voltage and the second period of time remains constant.

17. A method of voltage regulation, comprising:

determining, by a controller, an input voltage of a voltage regulator and an output power to be delivered to an output load coupled to the voltage regulator; and determining, by the controller, a switching frequency and a duty cycle of a switching module based on the input voltage, and a target value of the output power to be delivered to the output load, wherein the duty cycle is proportional to first and second periods of times in which different switches in the switching module are switched on, the switches being coupled between the input voltage and a resonant converter, and the resonant converter being coupled to the output load to convert the input voltage to an output voltage that provides the output power;

wherein the first period of time is controlled to be greater than the second period of time in response to the input voltage being greater than a crossover voltage, and the first period of time is controlled to be less than the second period of time in response to the input voltage being less than the crossover voltage, and wherein the crossover voltage is determined based at least in part on the output power to be delivered to the output load.

18. The method of claim 17, wherein the duty cycle is adjusted to 50% when the input voltage is equal to the crossover voltage.

19. The method of claim 17, further comprising:

increasing the output power and reducing a rising slope of an output current to the output load by increasing the duty cycle, while keeping the second period of time at a constant value, when the input voltage is greater than the crossover voltage; and increasing the second period of time to keep the output power at a constant value, the first period of time is increased at a lower rate than the second period of time, when the input voltage is less than the crossover voltage.

20. The method of claim 17, further comprising splitting the first period of time into multiple pulses to keep the output power closer to a constant value when the input voltage is increased above the crossover voltage.

* * * * *